US012572851B2

(12) United States Patent　　　　(10) Patent No.:　US 12,572,851 B2
Vhanamane et al.　　　　　　　　　(45) Date of Patent:　Mar. 10, 2026

(54) AUTOMATED SIMILARITY MEASUREMENT AND PROPERTY ESTIMATION

(71) Applicant: SCHLUMBERGER TECHNOLOGY CORPORATION, Sugar Land, TX (US)

(72) Inventors: Ranjit Ramchandra Vhanamane, Pimpri Chinchwad (IN); Hiren Maniar, Houston, TX (US); Sami Sheyh Husein, Kerkrade (NL); Aria Abubakar, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 554 days.

(21) Appl. No.: 17/999,277

(22) PCT Filed: Apr. 29, 2021

(86) PCT No.: PCT/US2021/029932
§ 371 (c)(1),
(2) Date: Nov. 18, 2022

(87) PCT Pub. No.: WO2021/236316
PCT Pub. Date: Nov. 25, 2021

(65) Prior Publication Data
US 2023/0281507 A1　　Sep. 7, 2023

Related U.S. Application Data

(60) Provisional application No. 63/026,583, filed on May 18, 2020.

(51) Int. Cl.
_G06N 20/00_　　　　(2019.01)

(52) U.S. Cl.
CPC ..................................... _G06N 20/00_ (2019.01)

(58) Field of Classification Search
CPC ....................................................... G06N 20/00
See application file for complete search history.

(56)　　　　　References Cited

U.S. PATENT DOCUMENTS

2011/0153300 A1　　6/2011　Holl
2018/0174052 A1*　6/2018　Rippel ................. G06V 40/172
(Continued)

OTHER PUBLICATIONS

Finn, C. et al., "Learning visual feature spaces for robotic manipulation with deep spatial autoencoders", Department of Electrical Engineering and Computer Science, University of California, Berkeley, CA, published 2015 <URL: http://www.icsi.berkeley.edu/pubs/vision/learningvisualfeaturespaces15.pdf>, 8 pages.
(Continued)

_Primary Examiner_ — Casey R. Garner
(74) _Attorney, Agent, or Firm_ — Kyle R. Miiller

(57)　　　　　ABSTRACT
A method includes receiving an input dataset representing one or more physical characteristics of a volume, generating an embedding by reducing a dimensionality associated with the input dataset using a trained machine learning model, comparing the embedding with a plurality of other embeddings generated by reducing a dimensionality of other datasets representing one or more physical characteristics of other volumes, selecting one or more of the other embeddings of the one or more other datasets based at least in part on comparing, and estimating one or more attributes of the volume based at least in part on the one or more other datasets corresponding to the selected one or more of the other embeddings.

21 Claims, 12 Drawing Sheets

(56) References Cited

U.S. PATENT DOCUMENTS

| | | | |
|---|---|---|---|
| 2019/0024494 A1 | 1/2019 | Maher | |
| 2019/0113638 A1 | 4/2019 | Wahrmund | |
| 2019/0121303 A1 | 4/2019 | Okadome | |
| 2019/0203575 A1* | 7/2019 | Schlosser | E21B 19/008 |
| 2019/0205751 A1* | 7/2019 | Cheung | E21B 47/00 |
| 2019/0243025 A1* | 8/2019 | Wlodarczyk | G01V 20/00 |
| 2019/0284921 A1 | 9/2019 | Xue | |
| 2019/0314985 A1* | 10/2019 | Sermanet | G06V 20/52 |
| 2020/0004886 A1 | 1/2020 | Ramanath | |
| 2020/0124753 A1 | 4/2020 | Halsey | |
| 2023/0161061 A1* | 5/2023 | Denli | G01V 1/30 |
| | | | 702/14 |

OTHER PUBLICATIONS

Wikipedia, "Autoencoder", published May 6, 2020 (archived version) <URL: https://en.wikipedia.org/w/index.php?title=Autoencoder&oldid=955130767>, 14 pages.

Navratil, J. et al., "Accelerating physics-based simulations using end-to-end neural network proxies: An application in oil reservoir modelling", Frontiers in Big Data, vol. 2, Article 33, published Sep. 20, 2019 <URL: https://www.frontiersin.org/articles/10.3389/fdata.2019.00033/pdf>, 13 pages.

Search Report and Written Opinion of International Patent Application No. PCT/US2021/029932 on Jun. 11, 2021; 10 pages.

International Preliminary Report on Patentability of International Patent Application No. PCT/US2021/029932 on Dec. 1, 2022; 7 pages.

* cited by examiner

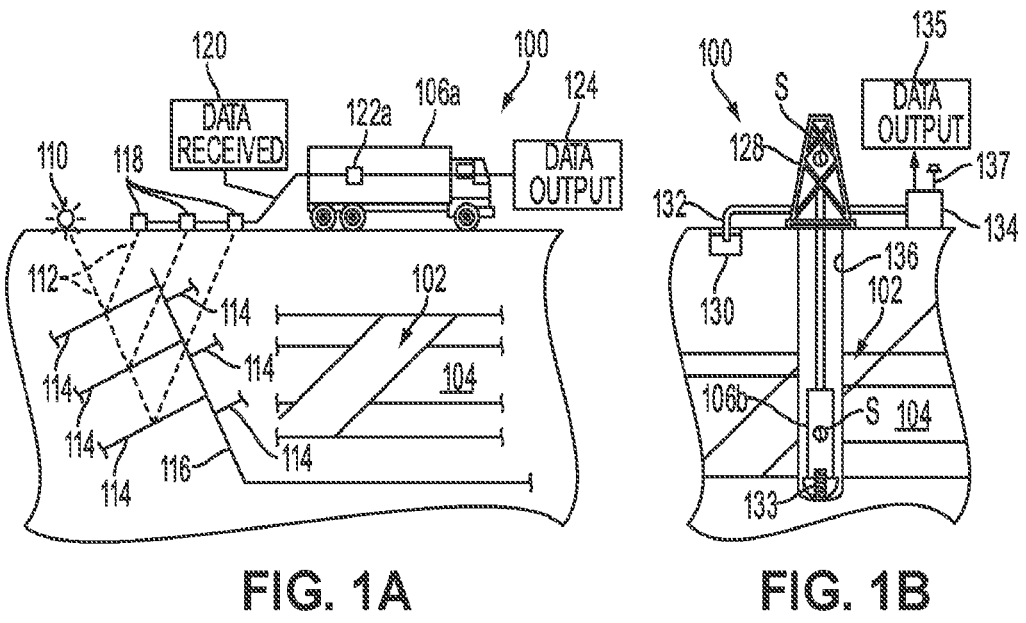
FIG. 1A　　　　FIG. 1B
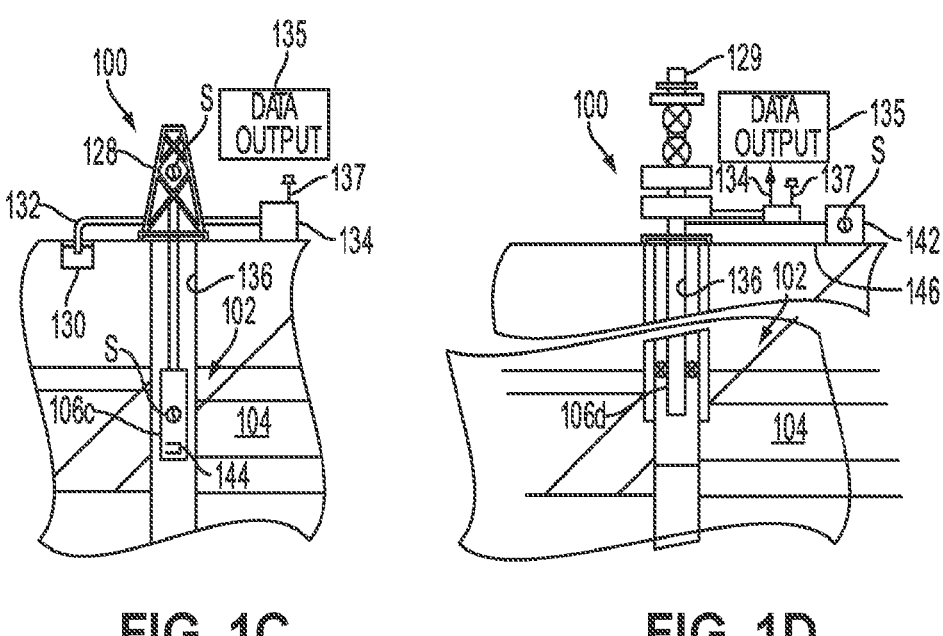
FIG. 1C　　　　FIG. 1D

700 ⟶

| Field ID OR Prospect ID | Attributes | Complete Dimensional Set | Reduced Dimensional Set |
|---|---|---|---|
| Field ID 1 | Area, Trap Class, Young age, Old age, Lithologies, Hydrocarbon type, Reservoir unit name, Parent lithostrat unit, Lithostrat unit etc., and data related to the parameter properties such as porosity, permeability, net thickness, gross thickness, oil and gas saturation etc., may also include unstructured data (images, well logs, descriptions, etc.) | - - - - - | - - - - - |
| Filed ID 2 | ... | - - - - - | - - - - - |
| Prospect ID 1 | Area, Trap Class, Young age, Old age, Lithologies, Hydrocarbon type, Reservoir unit name, Parent lithostrat unit, Lithostrat unit etc | - - - - - | - - - - - |

Original Data

Training Data

Low dimensional representational dataset (embeddings)

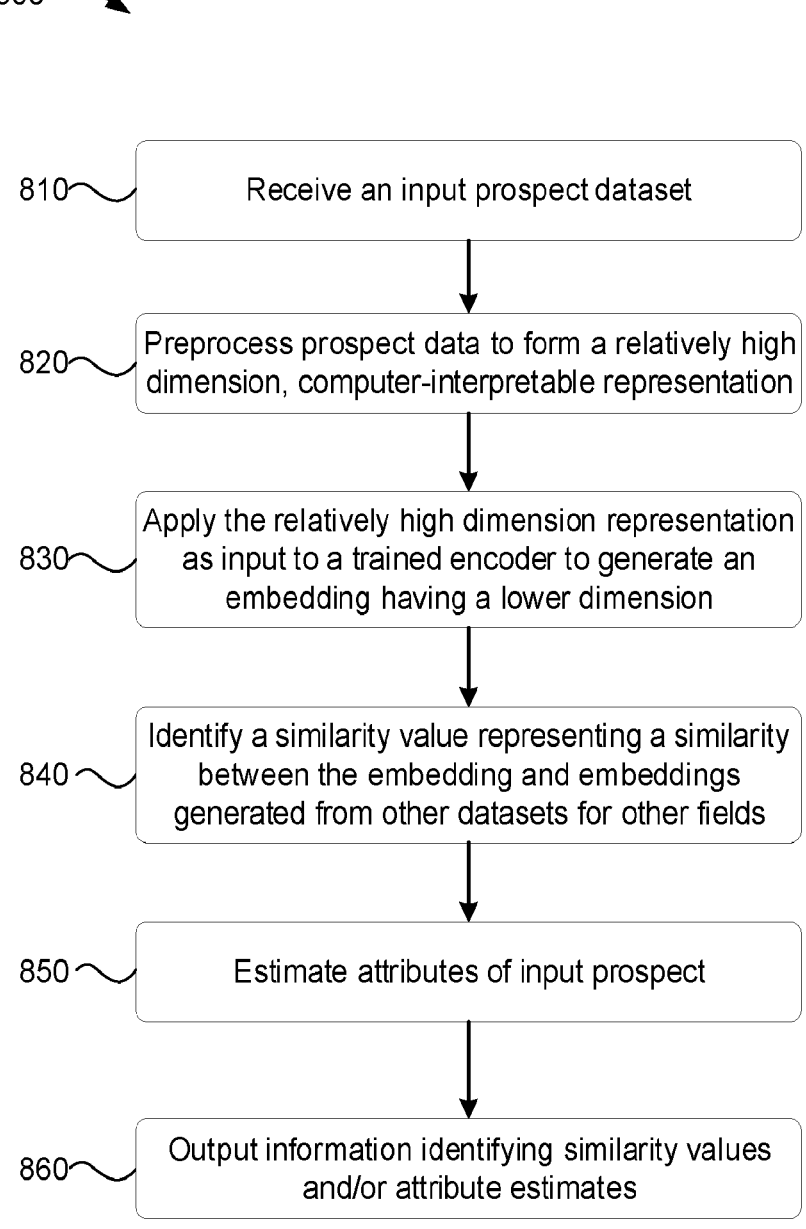

810 — Receive an input prospect dataset

820 — Preprocess prospect data to form a relatively high dimension, computer-interpretable representation 830 — Apply the relatively high dimension representation as input to a trained encoder to generate an embedding having a lower dimension 840 — Identify a similarity value representing a similarity between the embedding and embeddings generated from other datasets for other fields 850 — Estimate attributes of input prospect 860 — Output information identifying similarity values and/or attribute estimates

FIG. 8

AUTOMATED SIMILARITY MEASUREMENT AND PROPERTY ESTIMATION

CROSS-REFERENCE TO RELATED APPLICATIONS

This application is a National Stage Entry of International Application No. PCT/US2021/029932, filed Apr. 29, 2021, which claims priority to U.S. Provisional Patent Application having Ser. No. 63/026,583, which was filed on May 18, 2020 and is incorporated herein by reference in its entirety.

BACKGROUND

In the energy industry, a "field" may include an area having a set of properties potentially suitable for oil/gas exploration. Fields often include subsurface volumes ("geological areas") that have been previously explored and for which various field data may be available. A "prospect" generally refers to an area for which data may be relatively sparse, at least in comparison to more mature fields. A variety of databases (e.g., international exploration and production databases) may store information regarding fields, prospects, and/or post drill discoveries/failures. These databases may contain information related to general field data, reservoirs, geological information about the petroleum system elements by field and reservoir, hydrocarbon data, fluid characteristics, reservoir parameters, etc. This information may be used by explorationists to guide inputs to perform an assessment of potential prospects.

SUMMARY

Embodiments of the disclosure include a method that includes receiving an input dataset representing one or more physical characteristics of a volume, generating an embedding by reducing a dimensionality associated with the input dataset using a trained machine learning model, comparing the embedding with a plurality of other embeddings generated by reducing a dimensionality of other datasets representing one or more physical characteristics of other volumes, selecting one or more of the other embeddings of the one or more other datasets based at least in part on comparing, and estimating one or more attributes of the volume based at least in part on the one or more other datasets corresponding to the selected one or more of the other embeddings.

Embodiments of the disclosure also include a computing system that includes one or more processors and a memory system including one or more non-transitory, computer-readable media storing instructions that, when executed by at least one of the one or more processors, cause the computing system to perform operations. The operations include receiving an input dataset representing one or more physical characteristics of a volume, generating an embedding by reducing a dimensionality associated with the input dataset using a trained machine learning model, comparing the embedding with a plurality of other embeddings generated by reducing a dimensionality of other datasets representing one or more physical characteristics of other volumes, selecting one or more of the other embeddings of the one or more other datasets based at least in part on comparing, and estimating one or more attributes of the volume based at least in part on the one or more other datasets corresponding to the selected one or more of the other embeddings.

Embodiments of the disclosure further include a non-transitory, computer-readable medium storing instructions that, when executed by one or more processors of a computing system, cause the computing system to perform operations. The operations include receiving an input dataset representing one or more physical characteristics of a volume, generating an embedding by reducing a dimensionality associated with the input dataset using a trained machine learning model, comparing the embedding with a plurality of other embeddings generated by reducing a dimensionality of other datasets representing one or more physical characteristics of other volumes, selecting one or more of the other embeddings of the one or more other datasets based at least in part on comparing, and estimating one or more attributes of the volume based at least in part on the one or more other datasets corresponding to the selected one or more of the other embeddings.

Thus, the computing systems and methods disclosed herein are more effective methods for processing collected data that may, for example, correspond to a surface and a subsurface region. These computing systems and methods increase data processing effectiveness, efficiency, and accuracy. Such methods and computing systems may complement or replace conventional methods for processing collected data. This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

FIG. 7 illustrates an example data structure storing input training data and computer-interpretable dataset representing the training data.

FIG. 8 illustrates an example flowchart of a process for using a trained machine learning model to identify measures of similarity between a target prospect dataset and fields.

DESCRIPTION OF EMBODIMENTS

Figure 2:
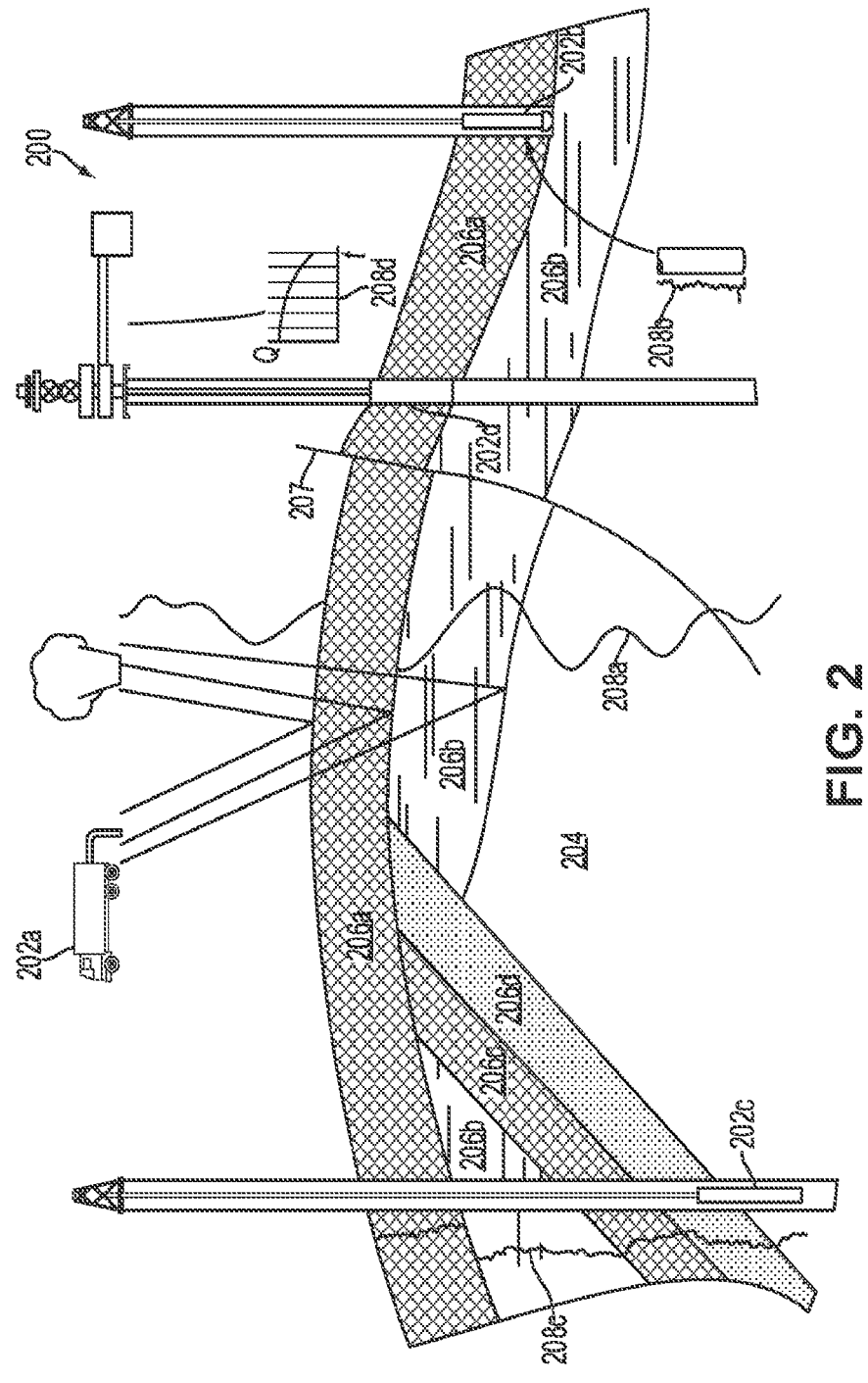

Databases may store various geological data for fields and prospects. As described herein, a "field" refers to an area that has been previously explored and for which data is available, and a "prospect" refers to an area for which a subset of data is available, with another subset being presently unavailable. For example, information related to particular geological properties, such as porosity, permeability, net thickness, gross thickness etc. may not be available since the prospects may be newly identified and in an early exploration stage. At least some of these geological properties can be estimated by manually searching databases for similar fields with respect to the prospect of interest based on common attributes between the similar fields and the prospect. Such interpolation and estimation techniques may be used to estimate the attributes of a prospect in which an extensive exploration or study has not been completed. Examples of known field attributes may include area, trap class, geological age, lithologies, depositional environment hydrocarbon type, reservoir unit name, parent lithostrat unit, lithostrat unit, porosity, permeability, net reservoir thickness, gross reservoir thickness, oil and gas saturation, etc. Attributes of a prospect may include a subset of the attributes for a field (e.g., those previously mentioned), thus, the remaining attributes may be estimated.

Estimation techniques may be highly labor-intensive and potentially inaccurate. Further, the search inside historical databases is extremely difficult since the databases contain many variables and complex correlations between these variables. The complexity of the estimation increases dramatically when estimating the attributes of basins having multiple fields and prospects. Accordingly, aspects of the present disclosure may include a system and/or method to improve the accuracy of estimating attributes of prospects and to reduce the amount of time and effort in performing such estimation. More specifically, aspects of the present disclosure may implement machine learning techniques to train a machine learning system which may be used to identify analogous fields and potentially to estimate the attributes of prospects based on the data known for the identified, analogous fields. As a result, the attributes of more prospects may be determined with greater accuracy, thereby reducing the need to conduct extensive physical explorations, while further providing more complete datasets to be used as inputs in oil/gas simulations for simulating oil/gas recovery in a greater number of prospects.

As described herein, any variety of representation learning processes may be used to train a machine learning system to estimate the attributes of prospects. As one, illustrative example, an unsupervised machine learning model may be trained using available historical data of fields and prospects. As one illustrative, non-limiting example, an autoencoder may be used as part of the training, although any other variety of representation learning techniques may be used. The trained machine learning model may be used to rank fields similar to a given prospect. As one, illustrative example, cosine similarity between a prospect and field may be used to rank the field, although other distance metrics that compares any two vectors or multi-dimensional matrices may be applied. That is, a prospect may be inputted into the trained machine learning model in which the machine learning model outputs values may be used to obtain the similarity between the prospect and fields. Properties or attributes for the prospect may be estimated based on the fields having a relatively higher similarity than other fields. The trained machine learning model may be used to identify similarities between any number of prospects and fields. Thus, the properties or attributes for multiple prospects may be quickly estimated. Further, a measure of similarity between an input basin (e.g., a group of fields and prospects)

may be determined against other basins. Thus, aggregate property or attributes may be estimated for a basin based at least in part on its similarity to another basin, and the properties known for the other, similar basis.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor(S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors(S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106c suspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106c may be operatively connected to, for example, geophones 118 and a computer 122a of a seismic truck 106a of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106c to measure downhole parameters which relate to, for example porosity, permeability, fluid composition and/or other parameters of the field operation.

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106d in wellbore 136 and to surface facilities 142 via gathering network 146.

Sensors (S), such as gauges, may be positioned about oilfield 100 to collect data relating to various field operations as described previously. As shown, the sensor(S) may be positioned in production tool 106*d* or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors(S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more well sites.

FIG. 2 illustrates a schematic view, partially in cross section of oilfield 200 having data acquisition tools 202*a*, 202*b*, 202*c* and 202*d* positioned at various locations along oilfield 200 for collecting data of subterranean formation 204 in accordance with implementations of various technologies and techniques described herein. Data acquisition tools 202*a*-202*d* may be the same as data acquisition tools 106*a*-106*d* of FIGS. 1A-1D, respectively, or others not depicted. As shown, data acquisition tools 202*a*-202*d* generate data plots or measurements 208*a*-208*d*, respectively. These data plots are depicted along oilfield 200 to demonstrate the data generated by the various operations.

Data plots 208*a*-208*c* are examples of static data plots that may be generated by data acquisition tools 202*a*-202*c*, respectively; however, it should be understood that data plots 208*a*-208*c* may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208*a* is a seismic two-way response over a period of time. Static plot 208*b* is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208*c* is a logging trace that typically provides a resistivity or other measurement of the formation at various depths.

A production decline curve or graph 208*d* is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206*a*-206*d*. As shown, this structure has several formations or layers, including a shale layer 206*a*, a carbonate layer 206*b*, a shale layer 206*c* and a sand layer 206*d*. A fault 207 extends through the shale layer 206*a* and the carbonate layer 206*b*. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208*a* from data acquisition tool 202*a* is used by a geophysicist to determine characteristics of the subterranean formations and features. The core data shown in static plot 208*b* and/or log data from well log 208*c* are typically used by a geologist to determine various characteristics of the subterranean formation. The production data from graph 208*d* is typically used by the reservoir engineer to determine fluid flow reservoir characteristics. The data analyzed by the geologist, geophysicist and the reservoir engineer may be analyzed using modeling techniques.

Figure 3A:
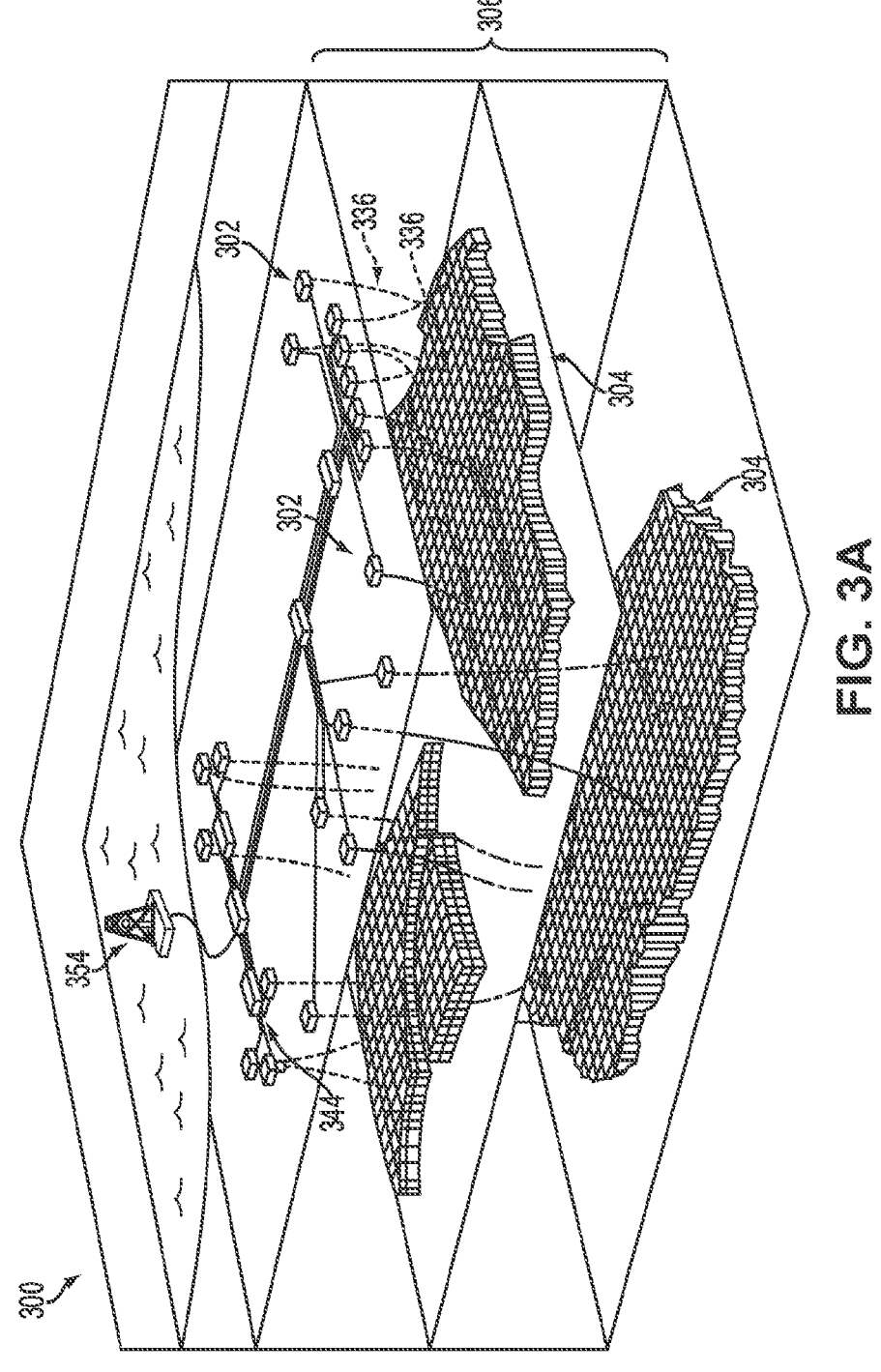

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
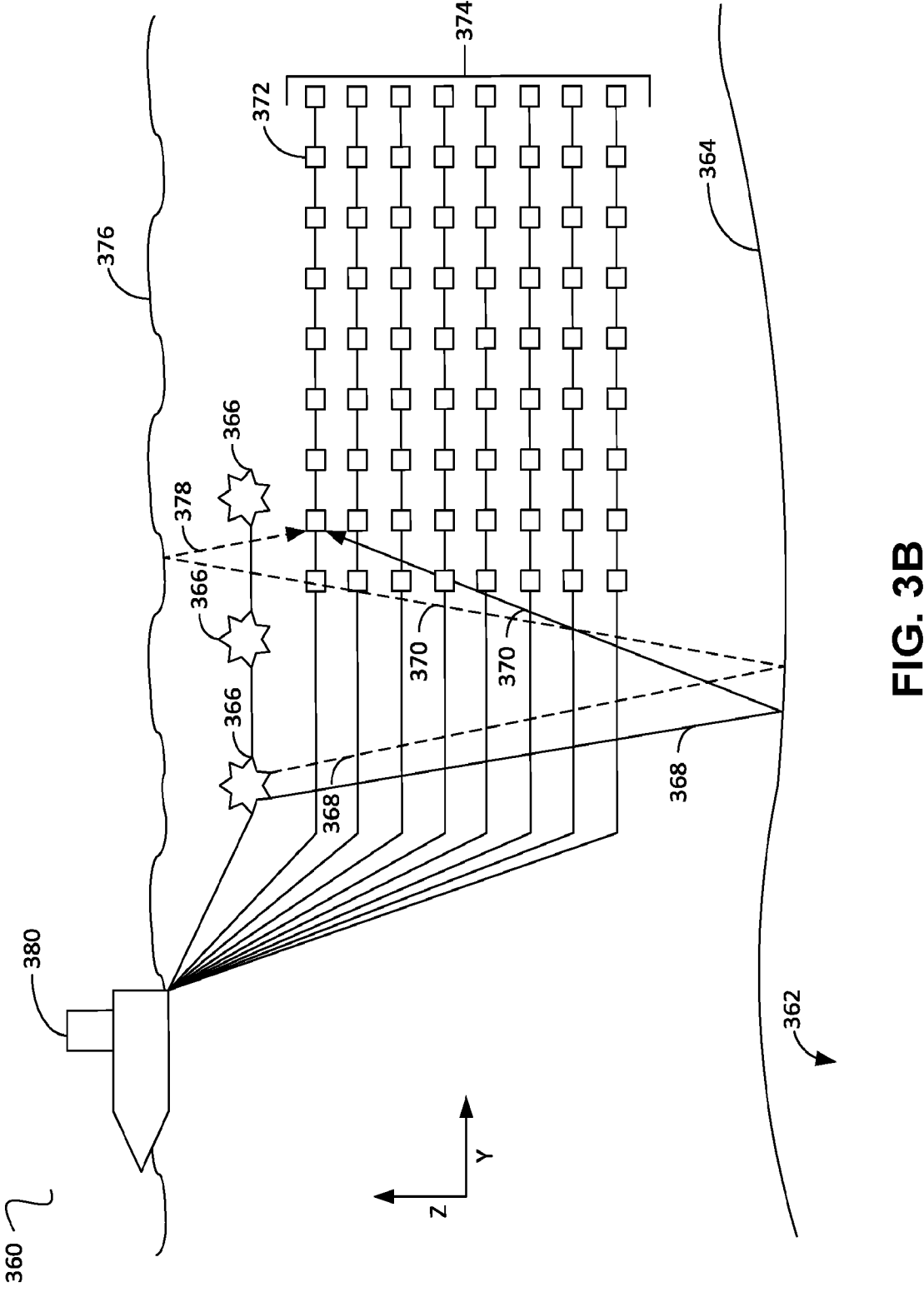

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Figure 4:
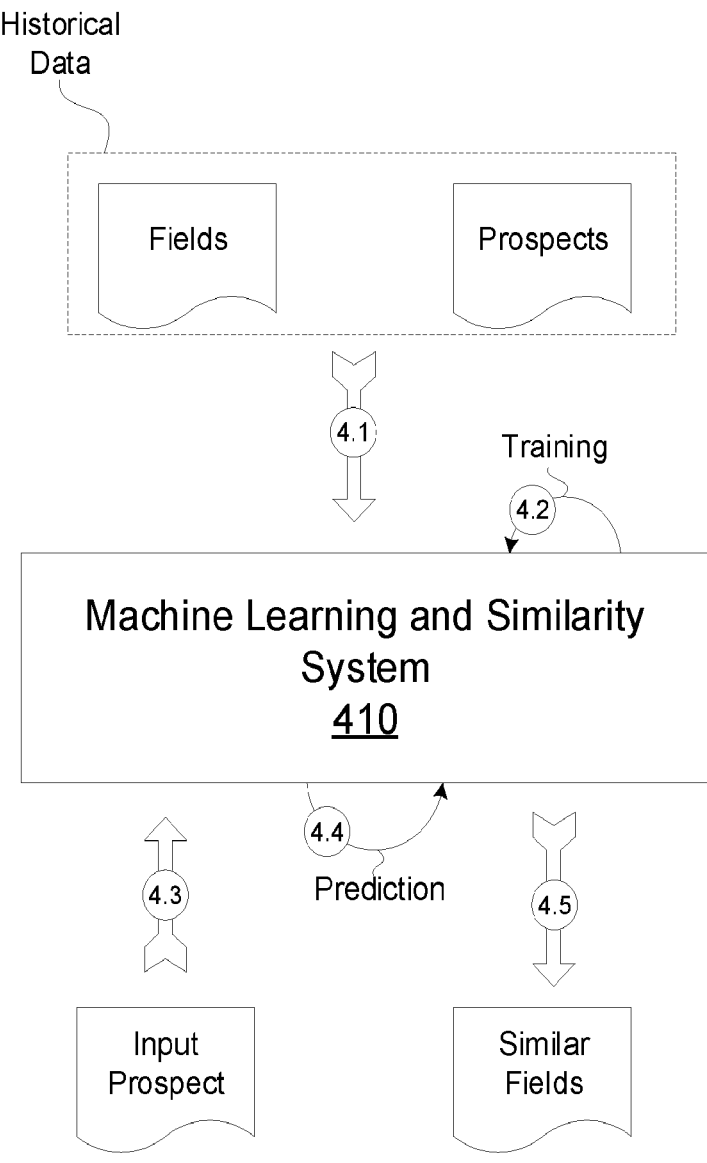
FIG. 4 illustrates an example overview of an example implementation described herein.

FIG. 4 illustrates an example overview of an embodiment of the present disclosure. As shown, a machine learning and similarity system 410 may receive (e.g., from a database, storage system, etc.) historical or known data (datasets) for fields and prospects (as at 4.1). More specifically, the "fields" data may represent physical characteristics of a subsurface volume, and may include measured attributes and/or interpreted attributes. Example attributes include area, trap class, geological age, lithologies, depositional environment, hydrocarbon type, reservoir unit name, parent lithostrat unit, lithostrat unit, porosity, permeability, net reservoir thickness and gross reservoir thickness, oil and gas saturation, other geological properties, and/or geomechanical properties.

The "prospects" data may include a subset of the data available for fields. As an example, the prospects data may include the same attributes or physical characteristics, or any subset thereof; however, certain attributes for the prospects may not be available, e.g., because the prospects may be newly identified or otherwise in an early exploration stage. For example, attributes relating to porosity, permeability, net reservoir thickness and gross reservoir thickness, oil and gas saturation, etc. may not be available for prospects at early stages. Since these attributes may be known and included in one or more datasets representing other fields, identifying analogous fields may permit extrapolation to the prospect field/dataset.

It is noted that the above-mentioned attributes are for illustrative purposes, and in practice, the techniques described herein may apply when the available data for fields and prospects differ from those mentioned herein. Moreover, embodiments of the present disclosure may apply to datasets outside of the oilfield context, and should not be limited thereto, unless expressly stated herein.

At 4.2, the machine learning and similarity system 410 may execute a training process to train a machine learning model based on the input historical data. As described herein, the training process may include forming a computer-interpretable, relatively high dimension representation from the input historical data. In some embodiments, the machine learning and similarity system 410 may translate the input historical data into such a computer-interpretable dataset. As described herein, a "computer-interpretable dataset" may refer to data represented in a non-linearly transformed space for feasible, economical, meaningful, and/or relevant comparison.

Further, the computer-interpretable data may undergo a non-linear transformation into lower dimensional representations (e.g., "embeddings") using machine learning algorithms. As described herein, "embeddings" may represent physical attributes (e.g., field data) from the input historical data, but may be of a relatively lower dimension, as compared to the original computer-interpretable data from the input historical data (i.e., the number of dimensions is reduced from the relatively higher representation to the relatively lower representation provided by the embedding). As one example for producing the embeddings, the relatively higher dimension representation may be applied to an encoder, and the encoder may apply an algorithm and weightings to produce the embeddings therefrom.

In some embodiments, the embeddings may be applied as an input to a decoder to generate a training or decoder-output representation that may be similar to, e.g., of the same dimensionality as, the relatively high dimension representation generated directly from the input dataset. The output of the decoder may be compared to the relatively high dimension representation and/or input dataset that was fed to the encoder. The weightings of the encoder may be selected/adjusted (e.g., using a back-propagation process) until the output from the decoder matches the input to the encoder to a threshold degree. Once the outputs from the decoder match the input to the encoder to the threshold degree, the machine learning model (particularly the encoder) may be considered to be trained, and the weightings information may be saved. This training process may be performed iteratively, potentially many times using many different datasets/representations as input, and may, in some cases, be continual, e.g., through to implementation and use of the machine learning model.

At 4.3, the machine learning and similarity system 410 (e.g., after training the machine learning model) receives information regarding an input prospect. At 4.4, the machine learning and similarity system 410 may use the trained machine learning model to predict or identify fields similar to the input prospect. More specifically, the machine learning and similarity system 410 may produce scores or measures of similarity between the prospect and multiple different fields. At 4.5, the machine learning and similarity system 410 may output the information of the similar fields (and their scores). In some embodiments, the outputted information may be provided to any variety of systems (e.g., simulation systems, planning systems, etc.). Additionally or alternatively, the outputted information may be presented in a report, stored in a database for future use, etc.

Figure 5:
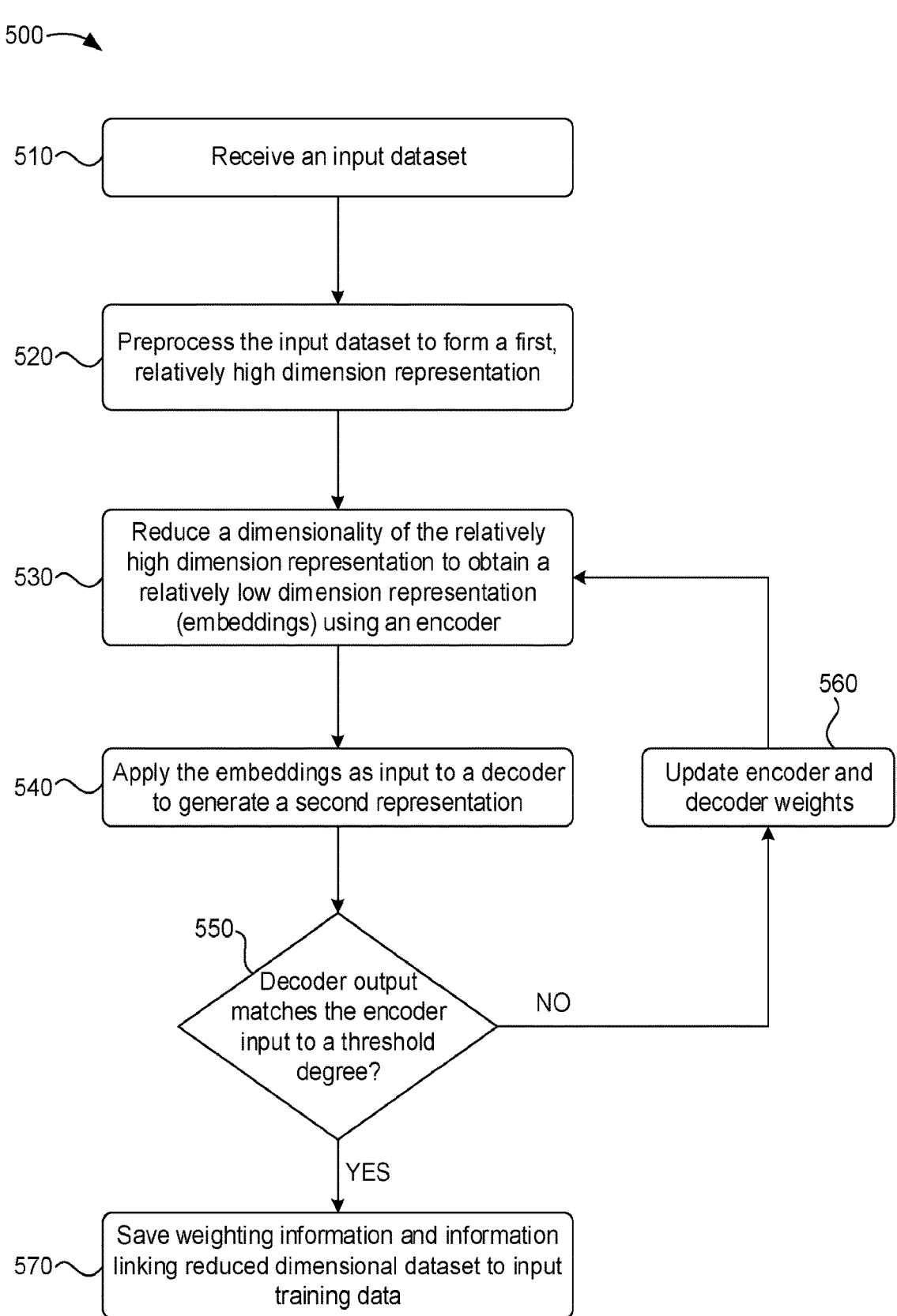
FIG. 5 illustrates an example flowchart of a process for training a machine learning model which may be used to identify measures of similarity between fields and prospects.

FIG. 5 illustrates an example flowchart of a process 500 for training a machine learning model which may be used to identify measures of similarity between fields and prospects, or between any two datasets. As noted herein, the flowchart illustrates the architecture, functionality, and operation of possible implementations of systems, methods, and computer program products according to various embodiments of the present disclosure. Further, the elements of the process 500 (or any other process described herein) may be performed in the order described below, or in any other order, without departing from the scope of the present disclosure. Moreover, the individual elements of the process 500 (or any other process described herein) may be performed in parallel, combined, or separated into two or more individual elements.

The process 500 may include receiving an input dataset (as at 510). For example, and with continuing reference to FIG. 4, the machine learning and similarity system 410 may receive a training dataset (e.g., from a database, storage system, etc. that stores and/or maintains the input training data). The input training dataset may include data representing physical characteristics of fields and prospects (e.g., attributes previously obtained from an exploration and/or data gathering process). An example of the input training dataset is illustrated as data structure 700 in FIG. 7 (e.g., the "original data" shown in FIG. 7). For example, the data structure 700 may include entries identifying a field or prospect, and attributes for the fields and prospects.

In some embodiments, the machine learning and similarity system 410 may build and populate the data structure 700 in conjunction with the process 500, described herein. For example, the original data (e.g., field ID, prospect IDs, and attributes) may be stored in the data structure 700 by the machine learning and similarity system 410 as the machine learning and similarity system 410 receives this information. In some embodiments, the training data may include any variety of quantitative and/or qualitative values and may be structured or unstructured.

The process 500 may also include preprocessing the input training dataset to form a first, relatively high dimension, computer-interpretable representation thereof (as at 520). For example, the input dataset may be vectorized so as to permit a multi-dimensional projection thereof, thereby providing a multi-dimensional "location" (e.g., coordinates) for the input training dataset. This location can be compared with other, similarly vectorized and projected datasets, for determining distance, which quantitatively indicates dataset similarity. For example, the machine learning and similarity system 410 may preprocess the input training data to form the relatively high dimension representation. For example, the dataset may be non-linearly normalized or otherwise given values, despite the presence of different types of data (e.g., numerical, Boolean, text, etc.). In some embodiments, the machine learning and similarity system 410 may store the relatively high dimension representation of the input training data for each field and prospect in the data structure 700.

The process 500 may also include reducing a dimensionality of the first, relatively high dimension representation to generate a relatively low dimension representation thereof ("embedding"), using an encoder (as at 530). For example, the machine learning and similarity system 410 may apply the relatively high dimension representation of the input training data as input to the encoder. In some embodiments, the encoder may apply an algorithm and weightings to produce the embeddings from the training data, or from samples of the training data, effectively reducing the number of dimensions in the relatively high dimension representation.

The process 500 also may include applying the embeddings as input to a decoder to generate a second (e.g., training/validation) representation (as at 540), which may have the same number of dimensions as the relatively high dimension representation that was inputted to the encoder. For example, the machine learning and similarity system 410 may apply the embeddings as input to a decoder to reconstruct training data (or alternatively, the samples from the training data), e.g., by increasing the dimensionality of the embeddings back to the relatively high dimension representation, or at least attempting to do so.

The process 500 further may include determining whether the second, training/validation representation that was generated by the decoder (i.e., decoder output) matches the first, relatively high dimension representation to a threshold degree (as at 550). For example, the machine learning and similarity system 410 may compare the output of the decoder (e.g., from block 540) to the relatively high dimension representation (e.g., formed at block 520). If, for example, the decoder output does not match the encoder input to a threshold degree, the weightings of the encoder and decoder may be updated (as at 560). The process 500 may return to block 530 in which the samples from the dataset may be applied to the encoder with the updated weightings to produce a lower dimensional representation (embedding) which may be subsequently applied to the decoder (as at 540), and compared to the samples from the dataset. The cycle of updating the weightings may continue until the decoder output matches the input to the encoder to a threshold degree.

Once the decoder output matches the encoder input to a threshold degree (block 550—YES), the process 500 also may include saving the weightings information and information linking the embeddings to the input training data (as at 570). For example, the machine learning and similarity system 410 may save the weightings information and information linking the embeddings. An example of the embeddings linked to the input training data is shown in the data structure 700 illustrated in FIG. 7. In this way, a machine learning model may be considered to be trained such that the machine learning model links the input training data with embeddings. The trained machine learning model may include a trained encoder, more specifically, the encoder with the saved weightings information applied to the encoder. As described in greater detail with respect to FIG. 8, the trained machine learning model, including the trained encoder, may be used to identify the similarity between fields and an input prospect dataset.

Figure 6:
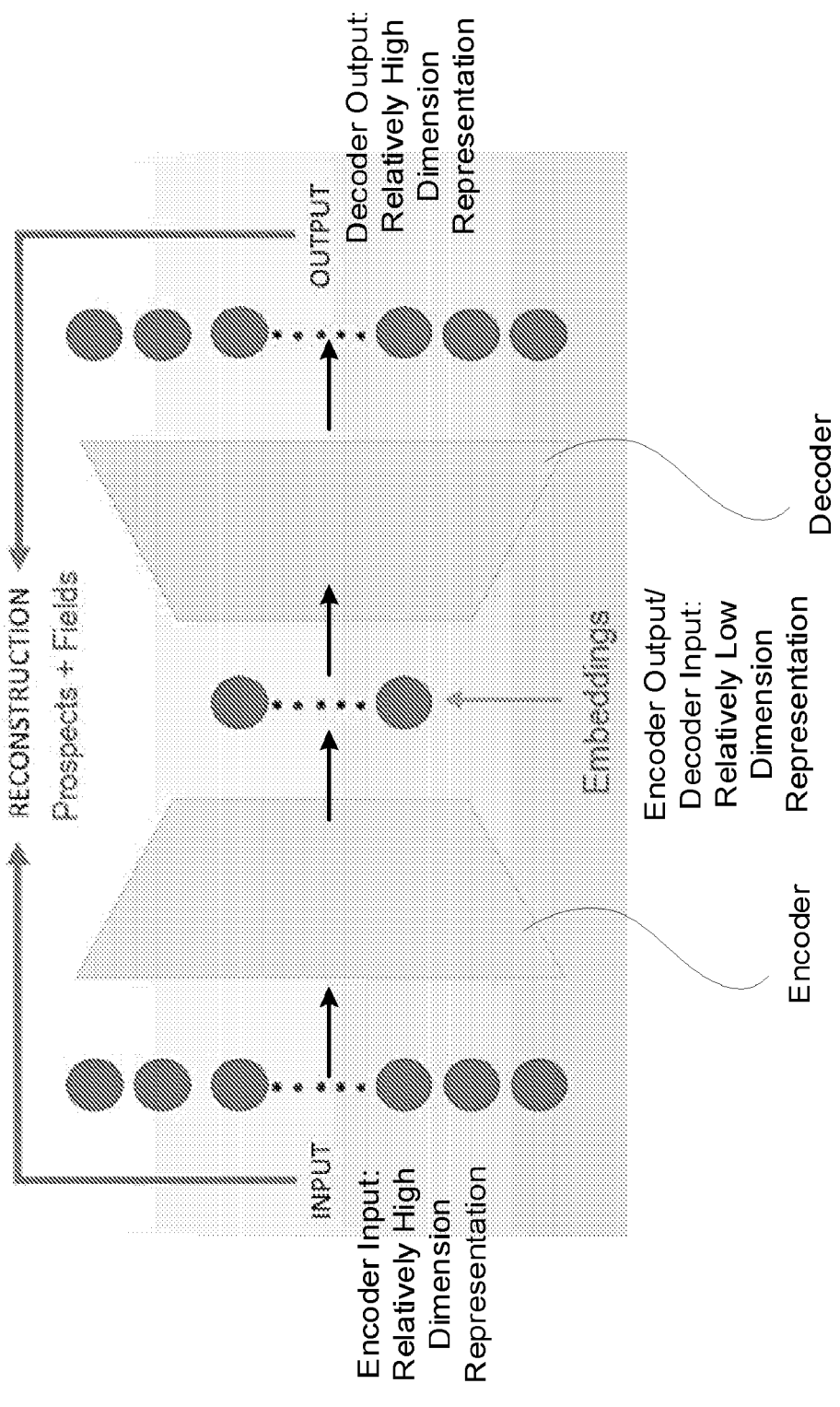
FIG. 6 illustrates a diagram for training an encoder as part of the machine learning process described in FIG. 5.

FIG. 6 illustrates a diagram for training an encoder as part of the machine learning process 500 described in FIG. 5. As shown in FIG. 6, the relatively high dimension, computer-interpretable representations of the input dataset are applied as input to the encoder (e.g., in a similar manner as described above with respect to process block 530). The output of the encoder may include embeddings (e.g., a relatively low (as compared to the relatively high) dimensional dataset). In turn, the embeddings may be applied as an input to the decoder (e.g., in a similar manner as described above with respect to process block 540). The output of the decoder (e.g., a reconstructed, relatively high dimension, computer-interpretable representation) may be compared to the relatively high dimension representation generated directly from the input training dataset (e.g., in a similar manner as described above with respect to process block 550). The weightings of the encoder and decoder may be updated (e.g., using a back-propagation process) until the decoder output matches the encoder input to a threshold degree (e.g., in a similar manner as described above with respect to process block 560). Once the outputs from the decoder match the encoder input to the threshold degree, the machine learning model may be considered to be trained, and the weightings information may be saved (e.g., in a similar manner as described above with respect to process block 570).

FIG. 8 illustrates an example flowchart of a process 800 for using a trained machine learning model to identify similarity between a target prospect and fields. As shown in FIG. 8, the process 800 may include receiving an input dataset, e.g., an input prospect dataset representing known physical characteristics of a prospect field (as at 810). The input dataset may be received in the machine learning and similarity system 410, which may be configured to identify fields similar to the prospect using the trained machine learning model (e.g., trained using the process 500 described in FIG. 5).

The process 800 may include preprocessing the input data to form a relatively high dimension representation (as at 820) that represents the input data in a computer-interpretable structure. For example, the machine learning and similarity system 410 may preprocess the input dataset to form a normalized, vectorized, relatively high dimension representation representing the input dataset as a multidimensional "location" (e.g., in a similar manner as described in process block 520).

The process 800 further may include applying the relatively high dimension representation as input to the trained encoder to form an embedding (as at 830), e.g., by reducing the dimensionality of the relatively high dimension representation. For example, the machine learning and similarity system 410 may apply the relatively high dimension representation as input to the trained encoder to form a relatively low dimension representation thereof, i.e., the embedding (generated using the process 500 of FIG. 5). Thus, the output of the encoder may include the embedding corresponding to the input prospect dataset (e.g., received at block 810), with a reduced number of dimensions in comparison to the relatively high dimension representation.

The process 800 may also include identifying similarity values between embeddings representing other datasets (e.g., other fields) and the embedding representing the input dataset (as at 840). More specifically, the machine learning and similarity system 410 may compare the embedding representing/generated from the input dataset with the embeddings representing/generated from other fields, using the trained model. Based on the comparing, the machine learning and similarity system 410 may determine similarities between the input dataset and other fields (or any other type of comparable dataset). In some embodiments, the machine learning and similarity system 410 may use a cosine similarity technique to obtain the measure of similarity between the input prospect dataset and fields (e.g., represented by the embeddings from the trained model). Additionally or alternatively, the machine learning and similarity system 410 may use any variety or combination of techniques to measure the similarity between the input prospect dataset and the fields. In some embodiments, the measure of similarity may be on a scale (e.g., from 0 to 1.00, in which values closer to 1 represent closer similarities).

The process 800 further may include estimating attributes of the input prospect (as at 850). For example, the machine learning and similarity system 410 may estimate one or more attributes (e.g., geological properties) of the prospect, field, etc. represented by the input dataset based on the datasets representing the other fields. More specifically, the machine learning and similarity system 410 may estimate geological properties of the prospect based on the attributes of the fields similar to the attributes of the prospect. In some embodiments, the estimated attributes for the prospect may match the attributes of one or more similar fields (e.g., fields with similarity measurements satisfying a threshold), or may be adjusted based on differences between the prospect and the similar fields.

The process 800 further may include outputting information identifying similarity values (as at 850). For example, the machine learning and similarity system 410 may output information identifying similarity values (e.g., to a storage system, an application server, a simulation system, etc.). The process 800 may be repeated for any number of input datasets (e.g., prospects). In this way, similarity measurements between multiple different prospects may be determined (e.g., to identify similar fields for given prospects and/or to quickly and accurately estimate attributes/non-measured geological properties of multiple prospects).

While the process 800 has been described in terms of measuring similarity between a prospect and other fields, in practice, the process 800 may be used to measure similarity between an input field and other fields, an input field and other prospects, and/or an input prospect and other prospects. Further, the process 800 may not be limited to oilfield technologies, but may be applied to any dataset comparison, where the data may be reduced in dimension to embeddings, using an encoder, to facilitate rapid comparison.

In at least some embodiments, the comparison of embeddings, and subsequent selection of datasets of sufficient similarity (e.g., based on the similarity score meeting or exceeding a threshold) may be integrated into one of many different practical applications. More particularly, the identification of similar datasets, e.g., in the oilfield, may have many different practical applications, including the selection of datasets for offset well analysis, which may be employed to estimate physical characteristics of early-development fields or prospects. To such end, embodiments of the present disclosure may include generating a visual model of the subsurface volume that is represented by an input dataset based at least in part on the estimated attributes. Such models may be employed by well planners, reservoir engineers, geologists, geoscientiests, or other operators. Additionally or instead, the estimated attributes may be employed in well planning to make decisions about well location, trajectory, dogleg severity, hole dimensions, equipment selection, etc. Additionally or instead, the estimated attributes may be used to adjust drilling operation parameters, bit selection, rate of penetration, weight on bit, etc. Such practical applications may be improved by the provision of fast, efficient, and reliable comparison of datasets using machine learning models that are trained, e.g., in an unsupervised manner.

Figure 9:
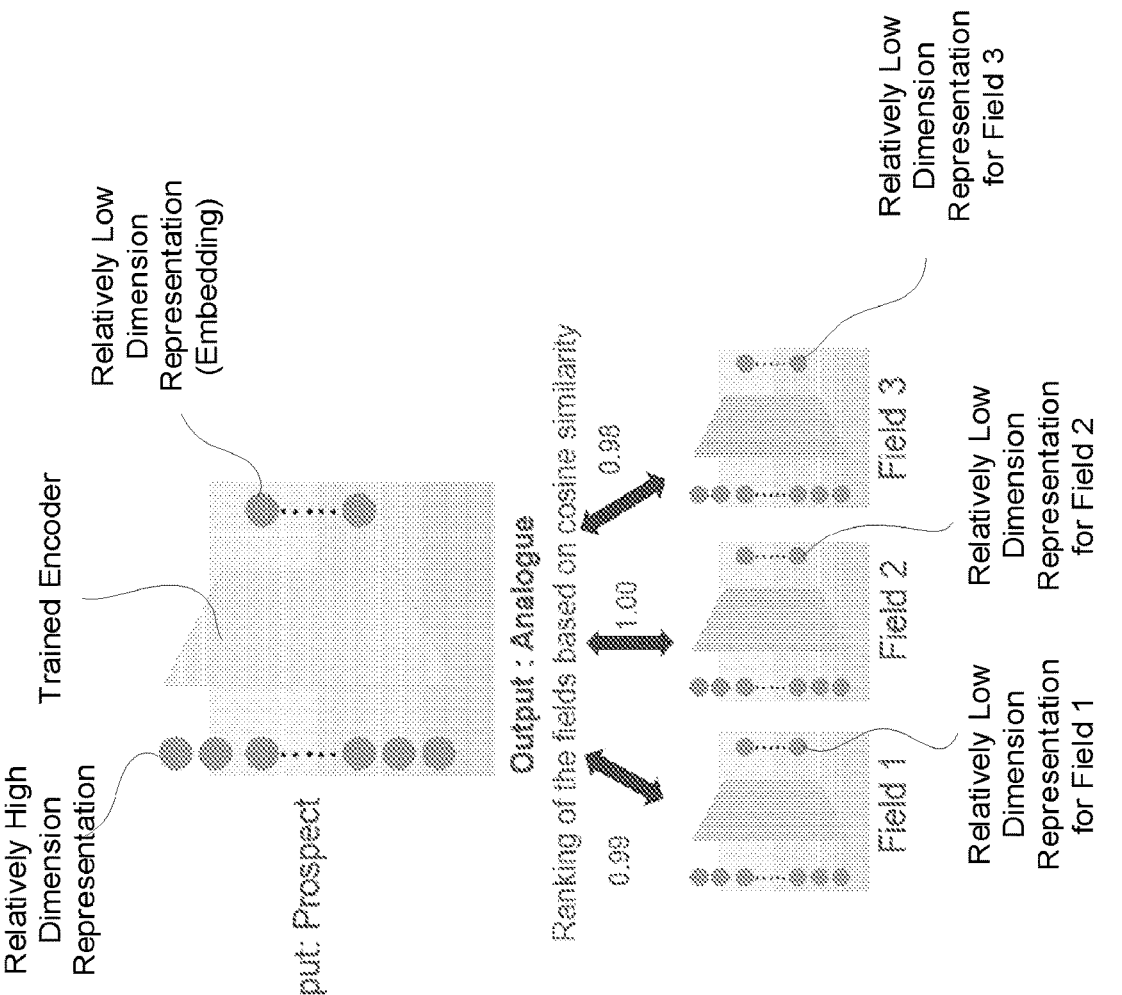
FIG. 9 illustrates a diagram for measuring similar between an input prospect dataset and multiple fields (e.g., in a similar manner as described with respect to the process 800 of FIG. 8).

FIG. 9 illustrates a diagram for identifying similarities between an input prospect dataset and multiple fields (e.g., in a similar manner as described with respect to the process 800 of FIG. 8). As shown in FIG. 9, input computer interpretable data for an input prospect may be applied to a trained encoder to form an embedding. This embedding for the input prospect dataset may be compared with the embeddings for fields obtained using machine learning model. The measures of similarities may be determined (e.g., on a scale of 0 to 1.00 as shown) using, for example, a cosine similarity technique (and/or any other variety of similarity techniques).

Figure 10:
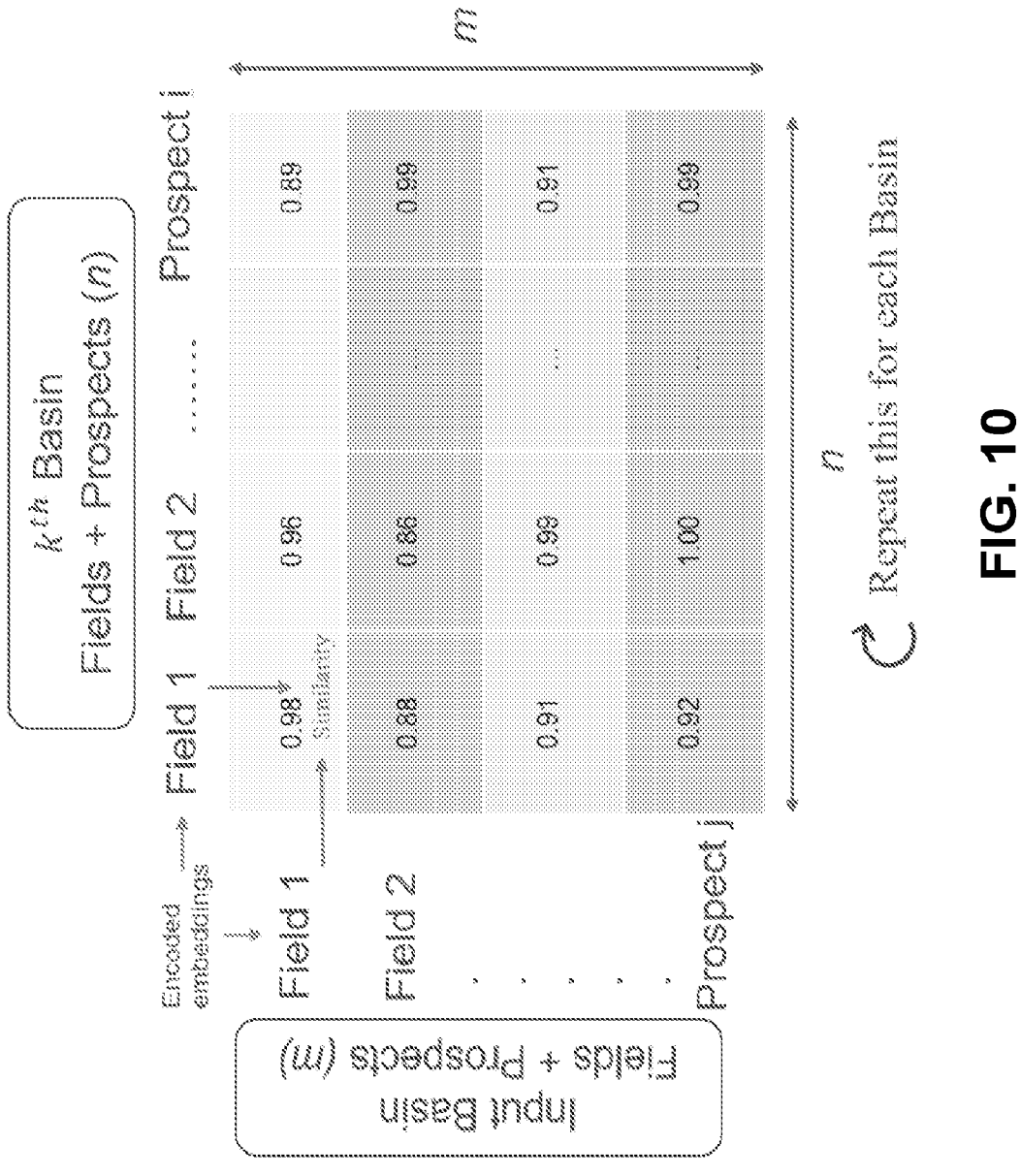
FIG. 10 illustrates a diagram from measuring similarity between two basins (e.g., an input basin and a target basin).

FIG. 10 illustrates a diagram from measuring similarity between two basins (e.g., an input basin and a target basin). As described herein, a "basin" may refer to a group of fields and/or prospects. As shown in FIG. 10, a comparison matrix may be formed between an input basin and a target basin (e.g., a $k^{th}$ basin in group of basins). In some embodiments, a cell in the comparison matrix may include a measure of similarity (e.g., similarity score or value) between a field or prospect in the input basin, and a field or prospect in the target basin. The similarity scores between one field or prospect and another field or prospect may be determined using the trained machine learning model as described above with respect to the process 800 of FIG. 8. From the similarity scores in the comparison matrix, a composite measure of similarity may be generated between input and target basins. For example, a matched pair ratio technique may be used in which a similarity threshold may be defined (e.g., 0.99) and a matched pair ratio may be calculated to represent the similarity between input and target basins. As an example, the matched pair ratio may be h/(m*n) in which h is the number of pairs above the similarity threshold, and m*n is the total number of cells in the comparison matrix. In some embodiments, the input basin may be compared with additional target basins by repeating the generation of the comparison matrix for the additional target basins.

As described herein, aspects of the present disclosure may implement machine learning and/or representation learning techniques to train a machine learning model for identifying similarities between fields and prospects. While certain machine leering techniques have been described herein, it is noted that aspects of the present disclosure are not limited to these techniques. That is, other representational learning techniques (e.g., other than autoencoding) may be implemented to train a machine learning model to learn the representational links between fields and prospects based on input training data.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 11:
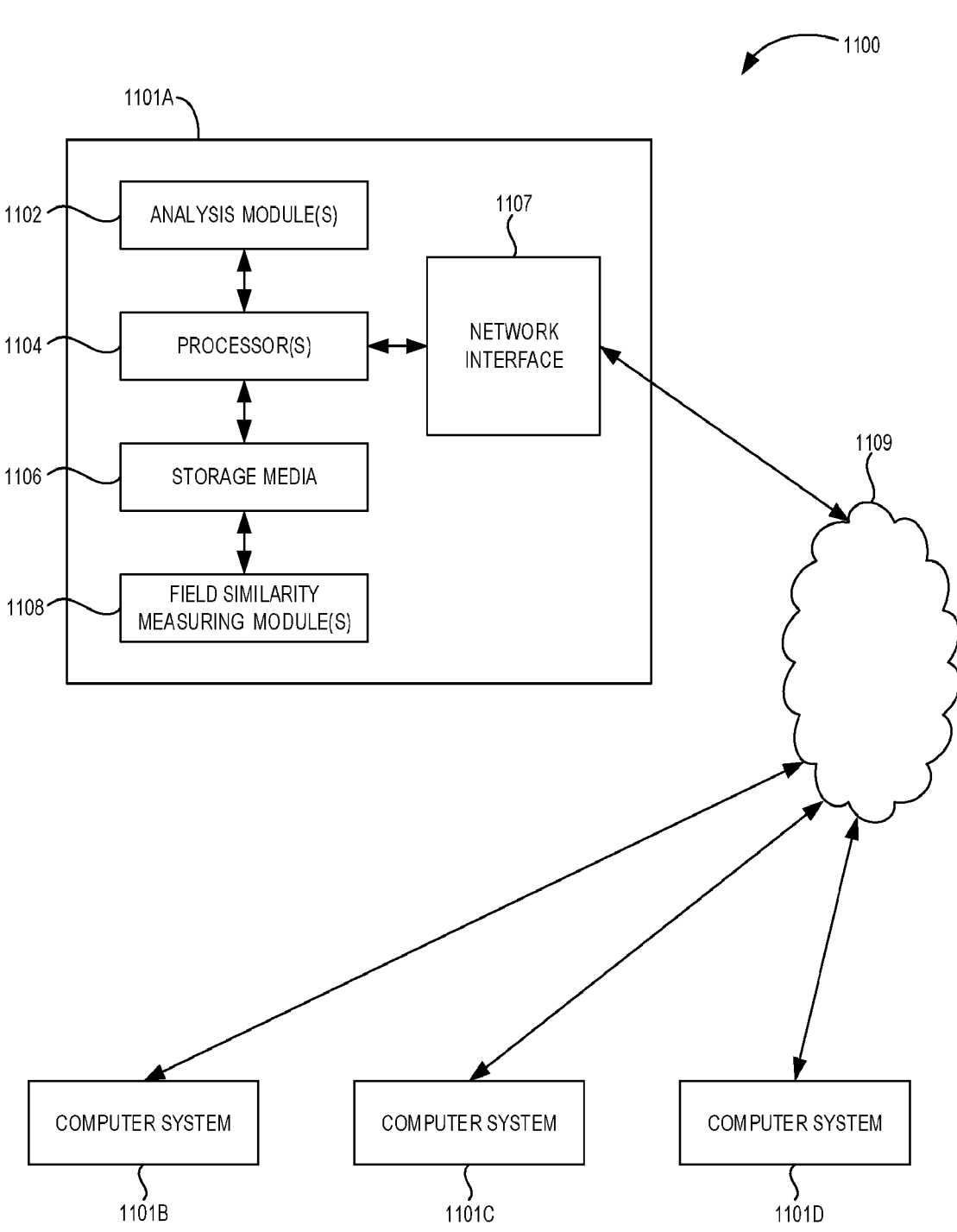
FIG. 11 illustrates a schematic view of a computing system, according to an embodiment.

In some embodiments, any of the methods of the present disclosure may be executed by a computing system. FIG. 11 illustrates an example of such a computing system 1100, in accordance with some embodiments. The computing system 1100 may include a computer or computer system 1101A, which may be an individual computer system 1101A or an arrangement of distributed computer systems. The computer system 1101A includes one or more analysis module(s) 1102 configured to perform various tasks according to some embodiments, such as one or more methods disclosed herein. To perform these various tasks, the analysis module 1102 executes independently, or in coordination with, one or more processors 1104, which is (or are) connected to one or more storage media 1106. The processor(s) 1104 is (or are) also connected to a network interface 1107 to allow the computer system 1101A to communicate over a data network 1109 with one or more additional computer systems and/or computing systems, such as 1101B, 1101C, and/or 1101D (note that computer systems 1101B, 1101C and/or 1101D may or may not share the same architecture as computer system 1101A, and may be located in different physical locations, e.g., computer systems 1101A and 1101B may be located in a processing facility, while in communication with one or more computer systems such as 1101C and/or 1101D that are located in one or more data centers, and/or located in varying countries on different continents).

A processor can include a microprocessor, microcontroller, processor module or subsystem, programmable integrated circuit, programmable gate array, or another control or computing device.

The storage media 1106 can be implemented as one or more computer-readable or machine-readable storage media. Note that while in the example embodiment of FIG. 11 storage media 1106 is depicted as within computer system 1101A, in some embodiments, storage media 1106 may be distributed within and/or across multiple internal and/or external enclosures of computing system 1101A and/or additional computing systems. Storage media 1106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1100 contains one or more field similarity module(s) 1108. In the example of computing system 1100, computer system 1101A includes the field similarity module 1108. In some embodiments, a single field similarity module 1108 may be used to perform some or all aspects of one or more embodiments of the methods. In alternate embodiments, a plurality of field similarity modules 1108 may be used to perform some or all aspects of methods.

It should be appreciated that computing system 1100 is only one example of a computing system, and that computing system 1100 may have more or fewer components than shown, may combine additional components not depicted in the example embodiment of FIG. 11, and/or computing system 1100 may have a different configuration or arrangement of the components depicted in FIG. 11. The various components shown in FIG. 11 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1100, FIG. 11), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method, comprising:

positioning a seismic sensor, a core acquisition tool, and a downhole sensor at a prospect;

receiving an input dataset representing a first set of physical characteristics of a first volume at the prospect, the input dataset received via the seismic sensor, the core acquisition tool, and the downhole sensor, wherein the input dataset comprises at least one of seismic data from the seismic sensor, core data from the core acquisition tool, or well log data from the downhole sensor;

generating a first embedding by reducing, via an encoder applying an algorithm, a dimensionality associated with the input dataset using a trained machine learning model, the encoder having a weighting adjusted by a back-propagation process;

comparing the first embedding with a second embedding generated by reducing a dimensionality of a known dataset representing the first set of physical characteristics of a second volume of an oilfield and a second set of physical characteristics of the second volume of the oilfield;

selecting the second embedding of the known dataset based at least in part on the comparing; and estimating the second set of physical characteristics of the first volume based at least in part on a second dataset corresponding to second embedding, wherein:

the first set of physical characteristics comprise at least one of an area, a trap class, a geological age, or a hydrocarbon type; and the second set of physical characteristics comprise at least one of a porosity, a permeability, a net reservoir thickness, a gross reservoir thickness, oil saturation, or gas saturation.

2. The method of claim 1, wherein the comparing comprises generating a similarity score representing a similarity between the first embedding and the second embedding, and wherein the selecting comprises selecting the second embedding based at least in part on the similarity score.

3. The method of claim 1, further comprising preprocessing the input dataset, before generating the first embedding, by representing the input dataset as a multi-dimensional location, wherein generating the first embedding by reducing the dimensionality comprises reducing a number of dimensions that represent the multi-dimensional location of the input dataset.

4. The method of claim 1, wherein the first volume is a subsurface volume, the method further comprising:

generating a visual model of the subsurface volume based at least in part on the estimated second set of physical characteristics;

generating a well plan for a well at least partially in the subsurface volume based at least in part on the estimated second set of physical characteristics; or adjusting a drilling operation based at least in part on the estimated second set of physical characteristics.

5. The method of claim 4, wherein the first set of physical characteristics of the first volume represented by the input dataset includes at least one of a geological attribute, a geomechanical attribute, a seismic image, or a well log.

6. The method of claim 1, further comprising training a machine learning model based on an input training dataset, so as to generate the trained machine learning model, wherein training the machine learning model comprises:

generating a training embedding by reducing a dimensionality of a first representation of the training input dataset using the encoder of the machine learning model;

generating a second representation by increasing a dimensionality of the training embedding using a decoder;

comparing the first representation and the second representation; and selecting or adjusting the weighting of the encoder based on the comparing, so as to increase a similarity between the first representation and the second representation.

7. The method of claim 1, further comprising:

positioning a mechanism at the oilfield;

positioning a surface unit functionally connected to a controller in communication with the seismic sensor, the core acquisition tool, and the downhole sensor, the controller configured to actuate the mechanism; and actuating the mechanism via the controller based on estimating the second set of physical characteristics so as to adjust at least one of a weight on a bit of the mechanism or a pump rate of the mechanism.

8. The method of claim 1, wherein the input dataset excludes a representation of the second set of physical characteristics of the first volume.

9. A computing system, comprising:

a seismic sensor positioned at a prospect;

a core acquisition tool positioned at the prospect;

a downhole sensor positioned at the prospect;

one or more processors in electrical communication with the seismic sensor, the core acquisition tool, and the downhole sensor; and a memory system including one or more non-transitory, computer-readable media storing instructions that, when executed by at least one of the one or more processors, cause the computing system to perform operations, the operations comprising:

receiving an input dataset representing a first set of physical characteristics of a first volume at the prospect, the input dataset received via the seismic sensor, the core acquisition tool, and the downhole sensor, wherein the input dataset comprises at least one of seismic data from the seismic sensor, core data from the core acquisition tool, or well log data from the downhole sensor;

generating a first embedding by reducing, via an encoder applying an algorithm, a dimensionality associated with the input dataset using a trained machine learning model, the encoder having a weighting adjusted by a back-propagation process;

comparing the first embedding with a second embedding generated by reducing a dimensionality of a known dataset representing the first set of physical characteristics of a second volume of an oilfield and a second set of physical characteristics of the second volume of the oilfield;

selecting the second embedding of the known dataset based at least in part on the comparing; and estimating the second set of physical characteristics of the first volume based at least in part on a second dataset corresponding to the second embedding, wherein:

the first set of physical characteristics comprise at least one of an area, a trap class, a geological age, or a hydrocarbon type; and the second set of physical characteristics comprise at least one of a porosity, a permeability, a net reservoir thickness, a gross reservoir thickness, oil saturation, or gas saturation.

10. The computing system of claim 9, wherein the comparing comprises generating a similarity score representing a similarity between the first embedding and the second, and wherein the selecting comprises selecting the second embedding based at least in part on the similarity score.

11. The computing system of claim 9, wherein the operations further comprise preprocessing the input dataset, before generating the first embedding, by representing the input dataset as a multi-dimensional location, wherein generating the first embedding by reducing the dimensionality comprises reducing a number of dimensions that represent the multi-dimensional location of the input dataset.

12. The computing system of claim 9, wherein the volume is a subsurface volume, the operations further comprising:

generating a visual model of the subsurface volume based at least in part on the estimated second set of physical characteristics;

generating a well plan for a well at least partially in the subsurface volume based at least in part on the estimated second set of physical characteristics; or adjusting a drilling operation based at least in part on the estimated second set of physical characteristics.

13. The computing system of claim 12, wherein the first set of physical characteristics of the first volume represented by the input dataset comprise at least one of a geological attribute, a geomechanical attribute, a seismic image, or a well log.

14. The computing system of claim 9, wherein the operations further comprise training a machine learning model based on an input training dataset to generate the trained machine learning model, wherein training the machine learning model, comprises:

generating a training embedding by reducing a dimensionality of a first representation of the training input dataset using the encoder;

generating a second representation by increasing a dimensionality of the training embedding using a decoder;

comparing the first representation and the second representation; and selecting or adjusting the weighting of the encoder based on the comparing, so as to increase a similarity between the first representation and the second representation.

15. The computing system of claim 14, wherein the operations further comprise:

associating the first embedding generated from the input dataset with the first volume represented by the input dataset; and storing the first embedding for comparison with the second embedding generated from one or more other input datasets using the trained machine learning model.

16. A non-transitory, computer-readable medium storing instructions that, when executed by one or more processors of a computing system, cause the computing system to perform operations, the operations comprising:

receiving an input dataset representing a first set of physical characteristics of a first volume at a prospect, the input dataset received via a seismic sensor, a core acquisition tool, and a downhole sensor, wherein the input dataset comprises at least one of seismic data from the seismic sensor, core data from the core acquisition tool, or well log data from the downhole sensor;

generating first embedding by reducing, via an encoder applying an algorithm, a dimensionality associated with the input dataset using a trained machine learning model, the encoder having a weighting adjusted by a back-propagation process;

comparing the first embedding with a second embedding generated by reducing a dimensionality of a known dataset representing the first set of physical characteristics of a second volume of an oilfield and a second set of physical characteristics of the second volume of the oilfield;

selecting the second embedding of the known dataset based at least in part on the comparing; and estimating the second set of physical characteristics of the first volume based at least in part on a second dataset corresponding to the second embedding, wherein:

the first set of physical characteristics comprise at least one of an area, a trap class, a geological age, or a hydrocarbon type; and the second set of physical characteristics comprise at least one of a porosity, a permeability, a net reservoir thickness, a gross reservoir thickness, oil saturation, or gas saturation.

17. The medium of claim 16, wherein the comparing comprises generating a similarity score representing a similarity between the first embedding and the second embedding, and wherein the selecting comprises selecting the second embedding based at least in part on the similarity score.

18. The medium of claim 16, wherein the operations further comprise preprocessing the input dataset, before generating the first embedding, by representing the input dataset as a multi-dimensional location, wherein generating the first embedding by reducing the dimensionality comprises reducing a number of dimensions that represent the multi-dimensional location of the input dataset.

19. The medium of claim 16, wherein the first volume is a subsurface volume, the operations further comprising:

generating a visual model of the subsurface volume based at least in part on the estimated second set of physical characteristics;

generating a well plan for a well at least partially in the subsurface volume based at least in part on the estimated second set of physical characteristics; or adjusting a drilling operation based at least in part on the estimated second set of physical characteristics.

20. The medium of claim 19, wherein the first set of physical characteristics of the first volume represented by the input dataset comprise at least one of a geological attribute, a geomechanical attribute, a seismic image, or a well log.

21. The medium of claim 16, wherein the operations further comprise training a machine learning model based on an input training dataset to generate the trained machine learning model, wherein training the machine learning model, comprises:

generating a training embedding by reducing a dimensionality of a first representation of the training input dataset using the encoder;

generating a second representation by increasing a dimensionality of the training embedding using a decoder;

comparing the first representation and the second representation; and selecting or adjusting the weighting of the encoder based on the comparing, so as to increase a similarity between the first representation and the second representation.

* * * * *